(12) United States Patent
Son et al.

(10) Patent No.: US 7,808,366 B2
(45) Date of Patent: Oct. 5, 2010

(54) REFRIGERATOR AND METHOD OF CONTROLLING THE SAME

(75) Inventors: Chang Ho Son, Suwon-Si (KR); Hoon Kim, Suwon-Si (KR); Woon Sung Jung, Suwon-Si (KR); You Na Park, Seoul (KR); Hye Rim Lee, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1307 days.

(21) Appl. No.: 11/137,490

(22) Filed: May 26, 2005

(65) Prior Publication Data

US 2006/0145814 A1 Jul. 6, 2006

(30) Foreign Application Priority Data

Jan. 3, 2005 (KR) .................. 10-2005-0000289

(51) Int. Cl.
*H04Q 5/22* (2006.01)
*H04K 1/00* (2006.01)
*F25D 23/00* (2006.01)
*F25D 16/00* (2006.01)
*G06F 13/00* (2006.01)

(52) U.S. Cl. ..................................... 340/10.1; 380/270
(58) Field of Classification Search .............. 340/10.1, 340/572.1
See application file for complete search history.

(56) References Cited

U.S. PATENT DOCUMENTS

2002/0183882 A1   12/2002   Dearing et al.

2006/0107307 A1 *  5/2006   Knox et al. .................. 726/2

FOREIGN PATENT DOCUMENTS

| DE | 299 12 346 | 12/1999 |
|----|-----------|---------|
| JP | 7-183717 | 7/1995 |
| JP | 2001-319043 | 11/2001 |
| JP | 2002-081848 | * 3/2002 |
| JP | 2002-147920 | 5/2002 |
| JP | 2003-276809 | 10/2003 |
| JP | 2003-348637 | 12/2003 |
| JP | 2004-046904 | 2/2004 |
| JP | 2004-144357 | 5/2004 |
| JP | 2004-198043 | 7/2004 |

OTHER PUBLICATIONS

Klaus Finkenzeller, "RFID-Handbuch", Carl Hanser Verlag, Munich, Germany, Sep. 26, 2002, XP002342001.
European Patent Office Communication issued in corresponding European Patent Application No. 05 104 584.7-2210.
Japanese Patent Office Action, mailed May 15, 2007 and issued in corresponding Japanese Patent Application No. 2005-161284.

* cited by examiner

*Primary Examiner*—F. Ryan Zeender
*Assistant Examiner*—Fahd A Obeid
(74) *Attorney, Agent, or Firm*—Staas & Halsey LLP

(57) ABSTRACT

A refrigerator and a method of controlling the same. The refrigerator includes: tags attached to goods stored in a storage chamber; a reader, including a plurality of antennas having different identification distances, identifying the tags using the antennas; and a control unit detecting locations of the tags attached to goods stored in the storage chamber using the different identification distances of the antennas.

9 Claims, 6 Drawing Sheets

FIG 4

|  | FIRST STORAGE CELL (204a) | SECOND STORAGE CELL (204b) | THIRD STORAGE CELL (204c) | FOURTH STORAGE CELL (204d) |
|---|---|---|---|---|
| FIRST ANTENNA (206a) | O | X | X | X |
| SECOND ANTENNA (206b) | O | O | X | X |
| THIRD ANTENNA (206c) | O | O | O | X |
| FOURTH ANTENNA (206d) | O | O | O | O |

REFRIGERATOR AND METHOD OF CONTROLLING THE SAME

CROSS-REFERENCE TO RELATED APPLICATION

This application claims the benefit of Korean Patent Application No. 2005-0000289, filed on Jan. 3, 2005 in the Korean Intellectual Property Office, the disclosure of which is incorporated herein by reference.

BACKGROUND OF THE INVENTION

1. Field of the Invention

The present invention relates to a refrigerator, and more particularly, to a method of automatically identifying goods stored in its storage chamber to search stored positions of the identified goods.

2. Description of Related Art

Japanese Unexamined Patent Publication No. 2002-81848 discloses a method of identifying information, such as names, kinds, and stored positions, of goods stored in a storage chamber of a refrigerator. According to the method disclosed in the Japanese Unexamined Patent Publication No. 2002-81848, goods stored in the storage chamber of the refrigerator are easily identified, and the stored positions of the goods are also searched. To this end, additional antennas are mounted in storage cells of the storage chamber, respectively, such that the stored positions of the goods are searched by the respective antennas.

In the conventional refrigerator disclosed in Japanese Unexamined Patent Publication No. 2002-81848, at least two antennas are mounted in each of the storage cells of the storage chamber such that not only goods stored in the storage chamber are identified but also the stored positions of the goods are searched. Specifically, one antenna is mounted to each divider, by which the storage cells are divided from each other, and the other antenna is mounted to any one side of each storage cell for searching the stored positions of the goods. In other words, the at least one antennas are necessary for each storage cell as described above. Consequently, when the number of the divided storage cells is 4 as in Japanese Unexamined Patent Publication No. 2002-81848, at least eight antennas are necessary.

As the number of antennas increases, the number of wires used to electrically connect the antennas to each other also increases, and installation spaces for the antennas also increase. As a result, the size of the refrigerator needs to be increased, or the capacity of the storage chamber decreases. Furthermore, it is necessary to consider the installation spaces for the antennas when the design of the refrigerator is changed. Consequently, the change in design of the refrigerator is complicated, which increases the manufacturing costs of the refrigerator.

BRIEF SUMMARY

It is an aspect of the invention to mount a small number of antennas to one end surface of a storage chamber formed in a refrigerator, instead of mounting a large number of antennas to each of the inner side surfaces of several divided storage cells of the storage chamber, such that basic information of goods stored in the storage cells is identified and the stored positions of the goods are searched, thereby reducing cells that the antennas occupy, thus decreasing the size of the refrigerator or increasing the capacity of the storage chamber, and reducing the manufacturing costs of the refrigerator.

According to an aspect of the present invention, there is provided a refrigerator including: tags attached to goods stored in a storage chamber; a reader, including a plurality of antennas having different identification distances, identifying the tags using the antennas; and a control unit detecting locations of the tags attached to goods stored in the storage chamber using the different identification distances of the antennas.

According to another aspect of the present invention, there is provided a method of controlling a refrigerator having a storage chamber including a plurality of storage cells, tags attached to goods stored in the storage chamber, and a reader including a plurality of antennas having different identification distances, identifying the tags using the antennas, the method including detecting stored positions of the goods stored in the storage chamber by the different identification distances of the antennas.

According to another aspect of the present invention, there is provided a method of acquiring item-related data of items stored in storage cells of a refrigerator, including: acquiring, using a first antenna an identification distance of which is limited to a first storage cell, a first data set of items stored in the first storage cell and storing the first data set as first item data (M1); acquiring, using a second antenna an identification distance of which is limited to the first storage cell and a second storage cell, a second data set of items stored in the first and second storage cells, removing from the second data set the first item data (M1) to yield second item data (M2), and storing the second item data (M2); acquiring, using a third antenna an identification distance of which is limited to the first storage cell, the second storage cell, and a third storage cell, a third data set of items stored in the first through third storage cells, removing from the third data set the first item data (M1) and the second item data (M2) to yield third item data (M3), and storing the third item data (M3); and acquiring, using a fourth antenna, a fourth data set of items stored in the first storage cell, the second data cell, the third data cell, and a fourth storage cell, a fourth data set of items stored in the first, second, third, and fourth storage cells, removing from the fourth data set the first item data (M1), the second item data (M2), and the third item data (M3) to yield fourth item data (M4), and storing the fourth item data (M4). The antennae are located at a surface of the refrigerator and distances between the surface and the first, second, third, and fourth storage cells respectively increase.

According to another aspect of the present invention, there is provided a method of acquiring item-related data of items stored in storage cells of a refrigerator, including: acquiring, using a first antenna an identification distance of which is limited to a first storage cell, a first data set of items stored in the first storage cell and storing the first data set as first item data (M1); acquiring, using a second antenna an identification distance of which is limited to the first storage cell and a second storage cell, a second data set of items stored in the first and second storage cells, removing the first item data (M1) from the second data set to yield second item data (M2), and storing the second item data (M2); and acquiring, using a third antenna an identification distance of which is limited to the first storage cell, the second storage cell, and a third storage cell, a third data set of items stored in the first through third storage cells, removing the first item data (M2) and the second item data (M2) from the third data set to yield third item data (M3) and storing the third item data (M3). The antennae are located at a surface of the refrigerator and distances between the surface and the first, second and third storage cells respectively increase.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 4 is a view illustrating relations between identification distances of the antennas and searchable storage cells in the refrigerator according to an embodiment of the present invention;

DETAILED DESCRIPTION OF EMBODIMENTS

Figure 1:
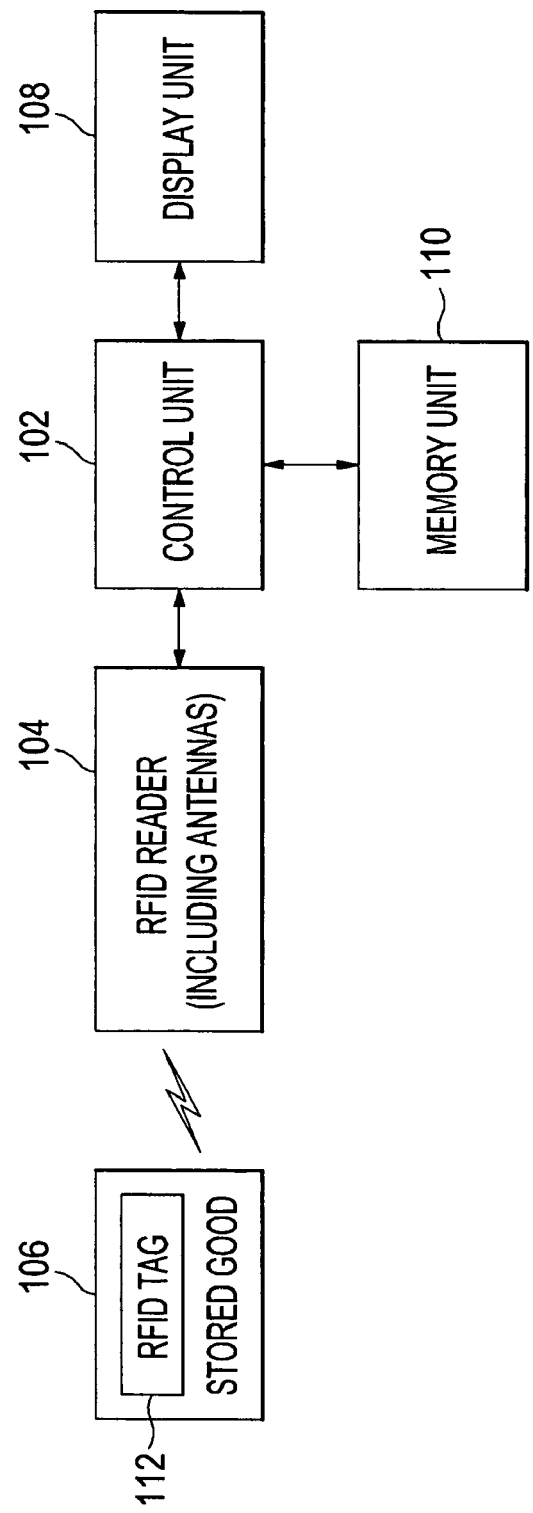
FIG. 1 is a block diagram illustrating a control system of a refrigerator according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a control system of a refrigerator according to an embodiment of the present invention. To the input of a control unit 102 that controls operation of the refrigerator is connected a radio frequency ID (RFID) reader 104, as shown in FIG. 1. The RFID reader 104 includes antennas for receiving radio frequency (RF) signals.

To each good 106 stored in a storage chamber of the refrigerator according to an embodiment of the present invention is attached an RFID tag 112, which contains information, such as, by way of non-limiting examples, the name, the kind, the storage date, and the expiration date, of the good 106. The RFID reader 104 transmits an RF signal to the RFID tag 112 and receives another RF signal from the RFID tag 112 for identifying the good 106 and obtaining the relevant information.

The information of the good 106 obtained from the RFID tag 112 is transmitted to the control unit 102, which stores the information of the good 106 in a memory unit 110. As necessary, the control unit 102 outputs the information of the good 106 to a display unit 108, which is electrically connected to the output of the control unit 102, such that a user confirms the information of the good 106. The display unit 108 displays not only basic information of the good 106 stored in the storage chamber but also the current stored position of the good 106. The stored position of the good 106 is displayed based on whether the good 106 is stored in a chilling chamber of the refrigerator or in a freezing chamber of the refrigerator, and in which storage cell the good 106 is stored when the good 106 is stored in the chilling chamber.

Figure 2:
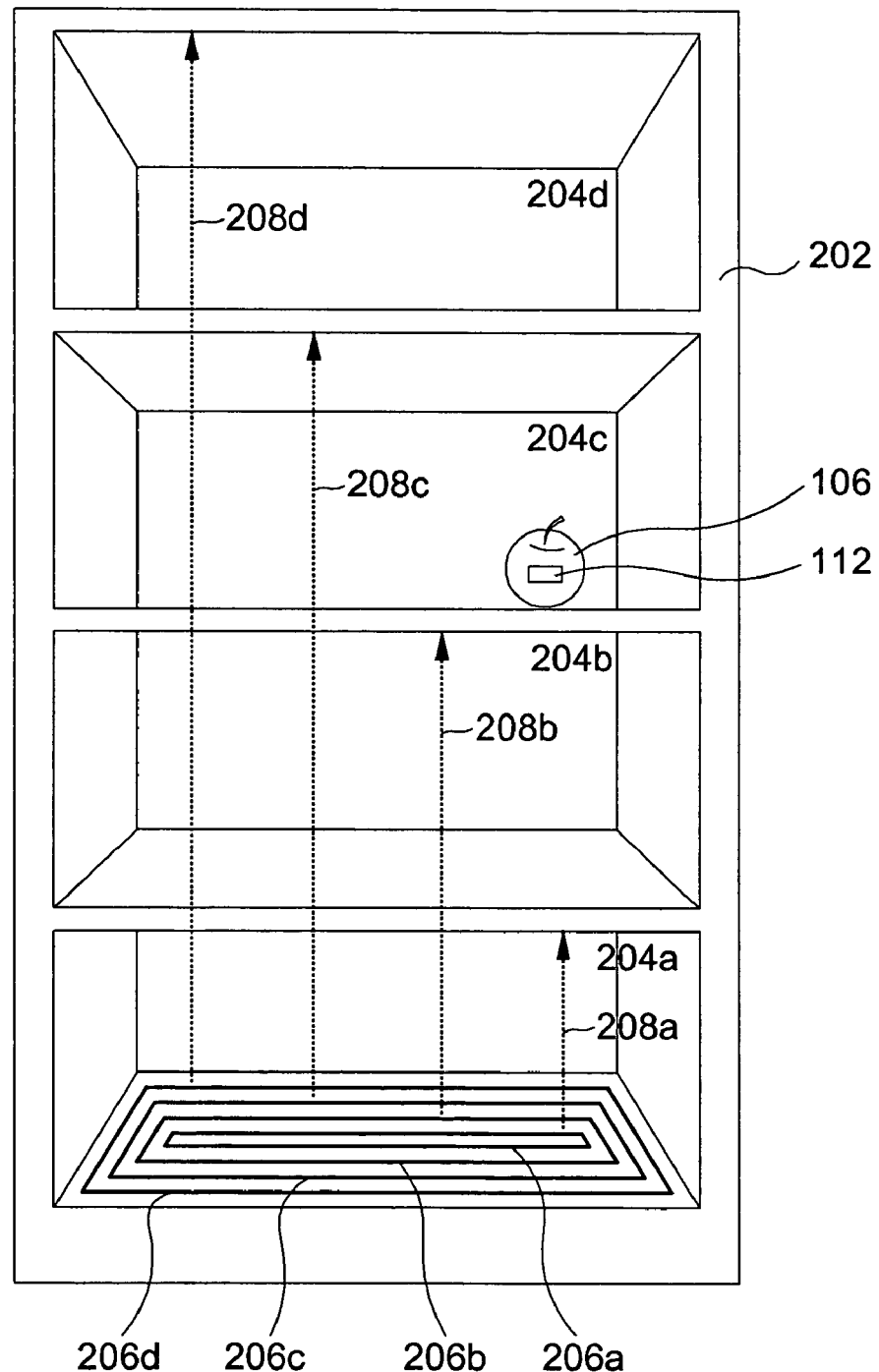
FIG. 2 is a view illustrating installation of antennas of the refrigerator according to an embodiment of the present invention.

FIG. 2 is a view illustrating installation of antennas of the refrigerator according to an embodiment of the present invention. Referring to FIGS. 1 and 2, the refrigerator has a plurality of antennas 206a to 206d, which are disposed at the inner bottom surface of a storage chamber 202 for reading data contained in an RFID tag 112 attached to a good 106 stored in the storage chamber 202 to search not only basic information of the stored good 106 but also the stored position of the stored good 106. The antennas 206a to 206d are mounted below the inner bottom surface of the storage chamber 202 to prevent the antennas 206a to 206d from being contaminated by stored goods or moisture.

As shown in FIG. 2, the storage chamber 202 includes four storage cells 204a to 204d. The antennas 206a to 206d are mounted below the inner bottom surface of the first storage cell 204a, which is the lowest storage cell, for generating magnetic fields. The magnetic field strengths generated from the antennas 206a to 206d are different from each other, since the antennas 206a to 206d have different radiuses. As a result, the antennas 206a to 206d have different RF signal transmission and reception distances 208a to 208d. The RF signal transmission and reception distance 208a of the first antenna 206a, which has the smallest radius, is limited from the inner bottom surface of the first storage cell 204a to the inner top surface of the first storage cell 204a. The RF signal transmission and reception distance 208b of the second antenna 206b, which has a radius slightly larger than that of the first antenna 206a, is limited from the inner bottom surface of the first storage cell 204a to the inner top surface of the second storage cell 204b. The RF signal transmission and reception distance 208c of the third antenna 206c, which has a radius slightly larger than that of the second antenna 206b, is limited from the inner bottom surface of the first storage cell 204a to the inner top surface of the third storage cell 204c. The RF signal transmission and reception distance 208d of the fourth antenna 206d, which has the largest radius, is limited from the inner bottom surface of the first storage cell 204a to the inner top surface of the fourth storage cell 204d.

In the refrigerator according to the present embodiment, at most one antenna is required to identify a tagged good in a storage cell. Thus, at most four antennas 206a to 206d are used to identify the goods stored in the four storage cells 204a to 204d (also used to search the locations of the stored goods).

The fact that the four antennas 206a to 206d have different RF signal transmission and reception distances means that the distances within which the antennas 206a to 206d can identify the RFID tag 112 are different from each other. The identification distances are determined based on the lengths of the four arrows 208a to 208d indicated in FIG. 2. When the antennas 206a to 206d are formed in the shape of a coil, the RF signal transmission and reception distances, i.e., the RFID tag identification distances are determined based on the radiuses of the antennas 206a to 206d, which are shown in FIG. 3.

Figure 3:
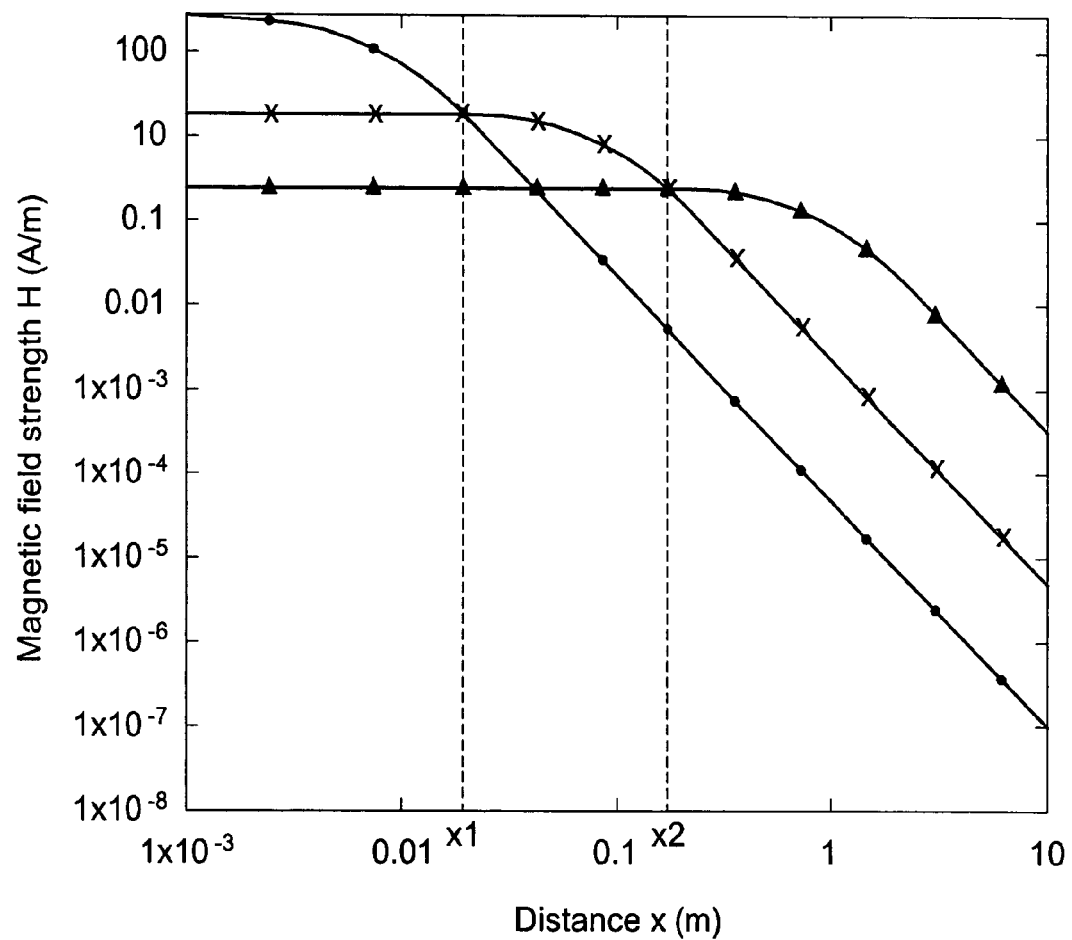
FIG. 3 is a graph illustrating magnetic field strengths based on distances from the antennas in a radio frequency identification (RFID) system.

FIG. 3 is a graph illustrating magnetic field strengths based on distances from the antennas in a RFID system, which refers to FIG. 4.4 of RFID Handbook (Klaus Finkenzeller, 2004). It can be seen from FIG. 3 that the magnetic field strengths are in reverse proportion to the radiuses R of the antennas when the distances from the antennas are below a specified value X1. When the distances from the antennas are above a specified value X2, on the other hand, the magnetic field strengths are proportional to the radiuses R of the antennas. Specifically, the difference in radius of the antennas 206a to 206d of FIG. 2 causes the difference in magnetic field strength, which means that the RFID tag identification distances of the antennas 206a to 206d may be changed to differ from each other. But, the magnetic field strengths are in proportion to the radiuses R of the antennas when the distances from the antennas are above the specified value X2. Consequently, the distances between the position where the antennas 206a to 206d are mounted and the inner bottom surface of the first storage cell 204a is above at least X2 in FIG. 2.

FIG. 4 is a view illustrating relations between identification distances of the antennas and searchable storage cells in the refrigerator according to the present embodiment. Refers to FIGS. 2 and 4, the first antenna 206a searches only the first storage cell 204a; the second antenna 206a searches the first and second storage cells 204a and 204b; the third antenna 206c searches the first to third storage cells 204a to 204c; and the fourth antenna 206d searches the first to fourth storage cells 204a to 204d.

It can be seen from FIG. 4 that, although the identification distances of the four antennas 206a to 206d are different from each other, the identification distances are partially overlapped with each other, and therefore, the search results are also overlapped. For this reason, it is necessary to provide a control method for extracting information of the stored goods for each storage cell from the search results of the goods stored in the storage chamber 202, which is illustrated in FIG. 5.

Figure 5:
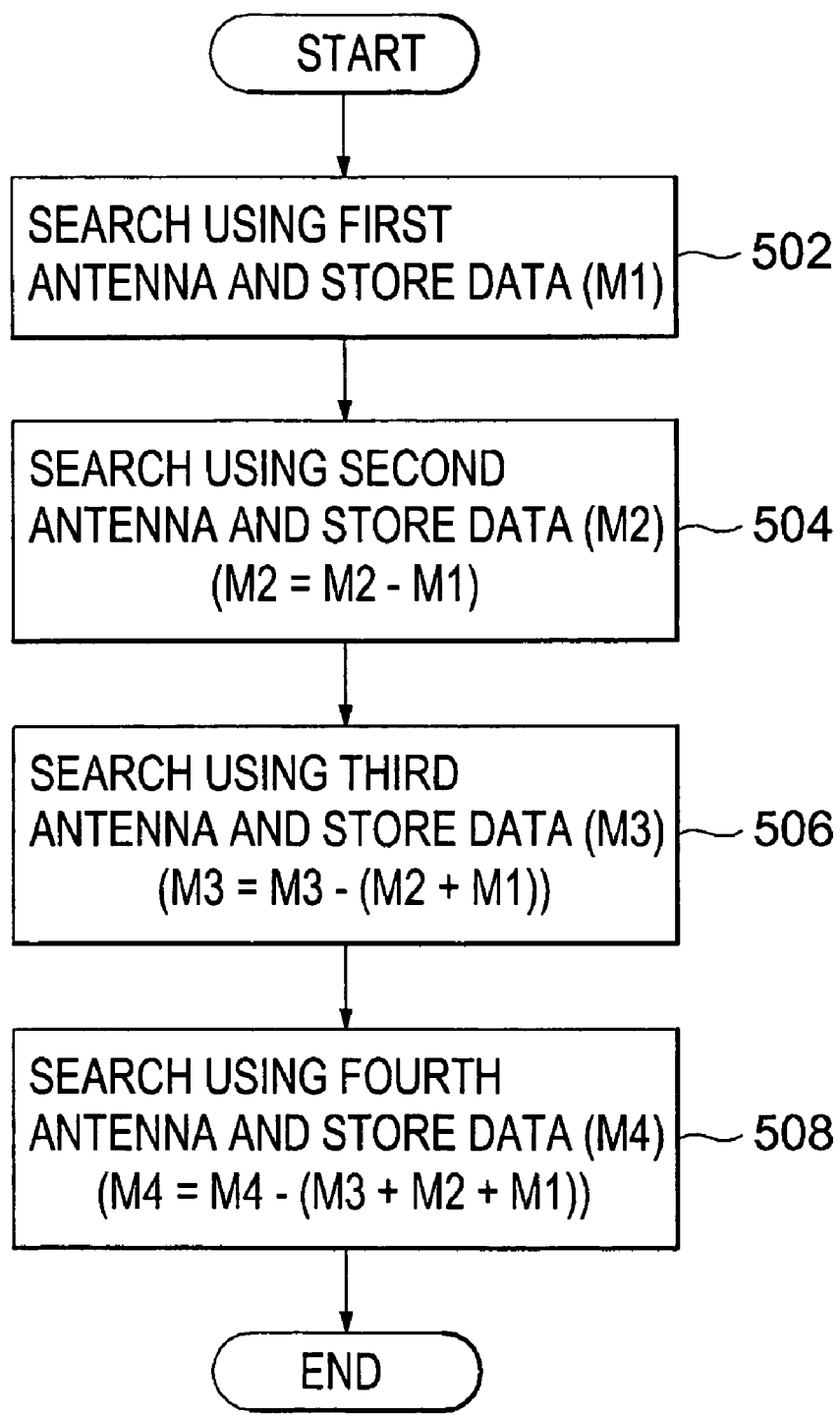
FIG. 5 is a flow chart illustrating a method of controlling a refrigerator according to an embodiment of the present invention.

FIG. 5 is a flowchart illustrating a method of controlling a refrigerator according to an embodiment of the present invention. The method can be performed by the respective control system and the refrigerator of FIGS. 1 and 2, and is, for ease of explanation, described in conjunction with those figures. However, it is to be understood that other apparatuses may perform the method.

Referring to FIGS. 1, 2, and 5, a search is performed first using the first antenna 206a to collect first stored good-related data M1, and the collected first stored good-related data M1 is stored in the memory unit 110 (operation 502). The identification distance of the first antenna 206a is limited to the first storage cell 204a. Consequently, the first stored good-related data M1 corresponds to information of the goods stored in the first storage cell 204a.

Next, another search is performed using the second antenna 206b to collect second stored good-related data M2, and the collected second stored good-related data M2 is stored in the memory unit 110 (operation 504). In this case, the second stored good-related data M2 corresponds to information of the goods stored in the first and second storage cells 204a and 204b. For this reason, the first stored good-related data M1 is removed from the second stored good-related data M2 to extract information of the goods stored only in the second storage cell 204b, and then the second stored good-related data M2 containing no first stored good-related data M1 is stored in the memory unit 110 (M2=M2−M1).

After that, another search is performed using the third antenna 206c to collect third stored good-related data M3, and the collected third stored good-related data M3 is stored in the memory unit 110 (operation 506). In this case, the third stored good-related data M3 corresponds to information of the goods stored in the first to third storage cells 204a to 204c. For this reason, the first and second stored good-related data M1 and M2 are removed from the third stored good-related data M3 to extract information of the goods stored only in the third storage cell 204c, and then the third stored good-related data M3 containing no first and second stored good-related data M1 and M2 is stored in the memory unit 110 (M3=M3−(M2+M1)). Here, M2 is second stored good-related data containing no first stored good-related data M1.

Finally, another search is performed using the fourth antenna 206d to collect fourth stored good-related data M4, and the collected fourth stored good-related data M4 is stored in the memory unit 110 (operation 508). In this case, the fourth stored good-related data M4 corresponds to information of the goods stored in the first to fourth storage cells 204a to 204d. For this reason, the first to third stored good-related data M1 to M3 are removed from the fourth stored good-related data M4 to extract information of the goods stored only in the fourth storage cell 204d, and then the fourth stored good-related data M4 containing no first to third stored good-related data M1 to M3 is stored in the memory unit 110 (M4=M4−(M3+M2+M1)). Here, M3 is third stored good-related data containing no first and second stored good-related data M1 and M2, and M2 is second stored good-related data containing no first stored good-related data M1.

The first to fourth stored good-related data M1 to M4 stored in the memory unit 110 through the above-described process correspond to information of the goods stored in the first to fourth storage cells 204a to 204d, respectively. Consequently, the stored positions of the goods stored in the storage chamber 202 can be identified by storage cell through the use of the information.

In the above-described embodiment of the present invention shown in FIGS. 1-5, the antennas 206a to 206d are sequentially operated to search the storage cells 204a to 204d, although the antennas 206a to 206d may be simultaneously operated, and then the difference between data collected by the respective antennas 206a to 206d may be extracted to obtain stored good-related data for each storage cell.

Figure 6:
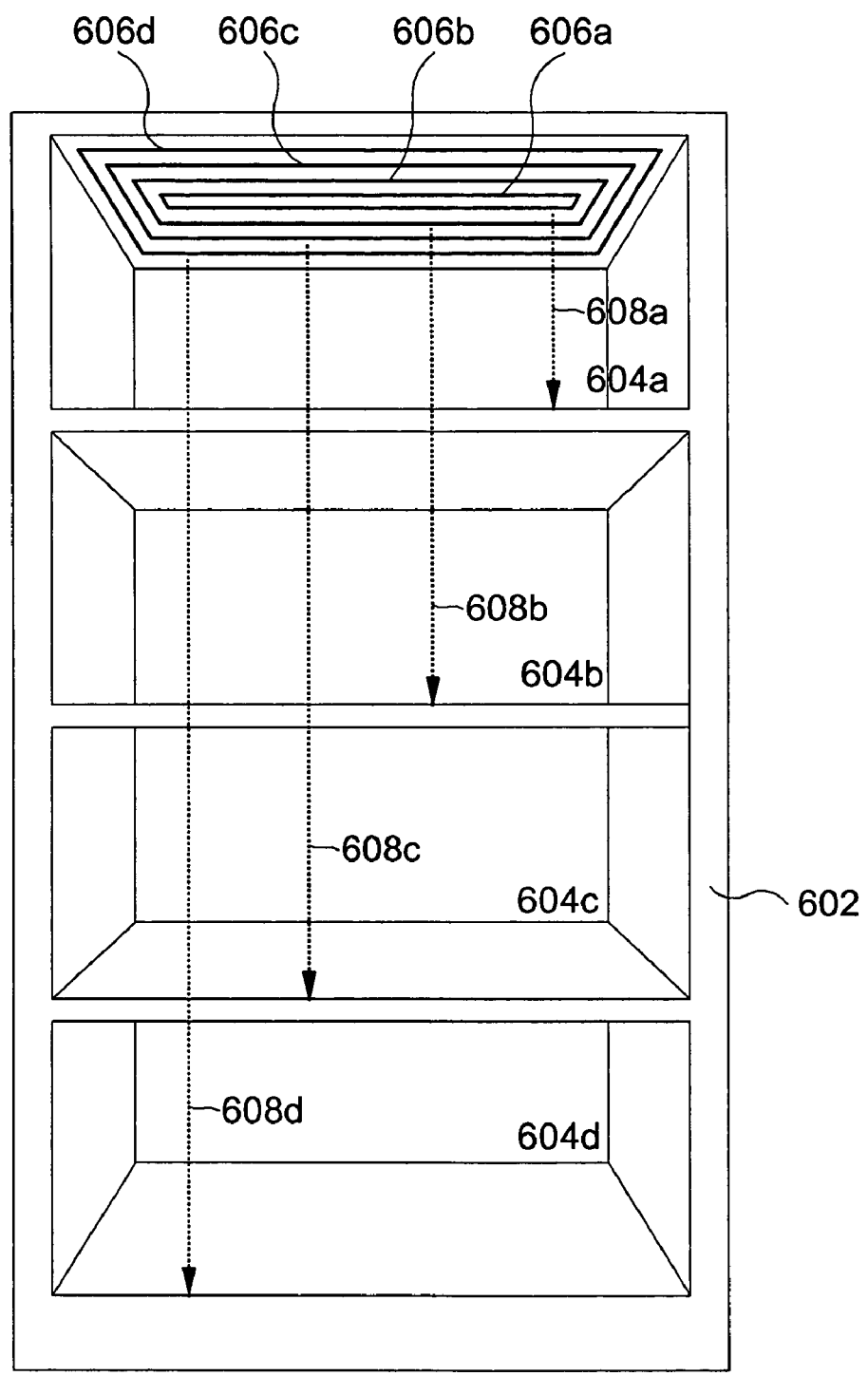
FIG. 6 is a view illustrating installation of antennas of a refrigerator according to another embodiment of the present invention.

FIG. 6 is a view illustrating installation of antennas of a refrigerator according to another embodiment of the present invention. As shown in FIG. 6, antennas 606a to 606d are preferably mounted above the inner top surface of a storage chamber 602 of the refrigerator. As described above, magnetic field strengths are in proportion to the radiuses of the antennas when the distances from the antennas are above the specified value X2. Consequently, the distances between the position where the antennas 606a to 606d are mounted and the inner top surface of the first storage cell 604a is above at least X2 in FIG. 6.

As apparent from the above description, a small number of antennas are mounted to one end surface of the storage chamber formed in the refrigerator, instead of mounting a large number of antennas to each of the inner side surfaces of several divided storage cells of the storage chamber, such that basic information of goods stored in the storage cells is identified and the stored positions of the goods are searched. Consequently, the above-described embodiments of the present invention have the effect of reducing cells that the antennas occupy, thus decreasing the size of the refrigerator or increasing the capacity of the storage chamber, and reducing the manufacturing costs of the refrigerator.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A refrigerator comprising:
    tags attached to goods stored in a storage chamber including a plurality of storage cells;
    a reader, including a plurality of antennas having different transmission and reception distances, identifying the tags using the antennas; and a control unit detecting locations of the tags attached to goods stored in the storage chamber based on whether the tags are detected by the different transmission and reception distances of the antennas, wherein the antennas correspond to the respective storage cells, and the storage cells are disposed within the transmission and reception distances of the corresponding antennas, and when the stored goods in the storage chamber is searched by the antennas, information of the stored goods is obtained by an antenna having a relatively small transmission and reception distance, information of the stored goods is obtained by another antenna having a relatively large transmission and reception distance, comparison between the information of the stored goods obtained by the antenna having the relative small transmission and reception distance and the information of the stored goods obtained by the antenna having the relatively large transmission and reception distance is made to extract the difference therebetween, and the difference between the information of the stored goods obtained by the antenna having the relative small transmission and reception distance and the information of the stored goods obtained by the antenna having the relatively large transmission and reception distance is determined as information of the goods stored in the storage cell corresponding to the antenna having the relatively large transmission and reception distance.

2. The refrigerator according to claim 1, wherein
the tags are radio frequency ID (RFID) tags, and
the antennas transmit and receive RF signals.

3. The refrigerator according to claim 1, wherein the storage chamber includes a plurality of storage cells, the antennas correspond to each of the respective storage cells, and the storage cells are disposed within the transmission and reception distances of the corresponding antennas.

4. The refrigerator according to claim 3, wherein the transmission and reception distances of the antennas are limited to the distances from the antennas to the corresponding storage cells.

5. The refrigerator according to claim 3, wherein the control unit performs a control operation to simultaneously operate the antennas when the control unit controls the reader to search the goods stored in the storage chamber.

6. The refrigerator according to claim 1, wherein the antennas generate magnetic fields having different respective strengths.

7. The refrigerator according to claim 1, wherein the antennas are roof antennas having different radiuses.

8. A method of controlling a refrigerator having a storage chamber including a plurality of storage cells, tags attached to goods stored in the storage chamber, and a reader including a plurality of antennas having different transmission and reception distances, identifying the tags using the antennas, the method comprising:

detecting stored positions of the goods stored in the storage chamber based on whether the tags are detected by the different transmission and reception distances of the antennas, wherein the antennas correspond to the respective storage cells, and the storage cells are disposed within the transmission and reception distances of the corresponding antennas, and when the stored goods in the storage chamber is searched by the antennas, information of the stored goods is obtained by an antenna having a relatively small transmission and reception distance, information of the stored goods is obtained by another antenna having a relatively large transmission and reception distance, comparison between the information of the stored goods obtained by the antenna having the relative small transmission and reception distance and the information of the stored goods obtained by the antenna having the relatively large transmission and reception distance is made to extract the difference therebetween, and the difference between the information of the stored goods obtained by the antenna having the relative small transmission and reception distance and the information of the stored goods obtained by the antenna having the relatively large transmission and reception distance is determined as information of the goods stored in the storage cell corresponding to the antenna having the relatively large transmission and reception distance.

9. The method according to claim 8, wherein the antennas are simultaneously operated to obtain information of the goods stored in the storage chamber when the reader is controlled to search the goods stored in the storage chamber.

* * * * *